UNITED STATES PATENT OFFICE.

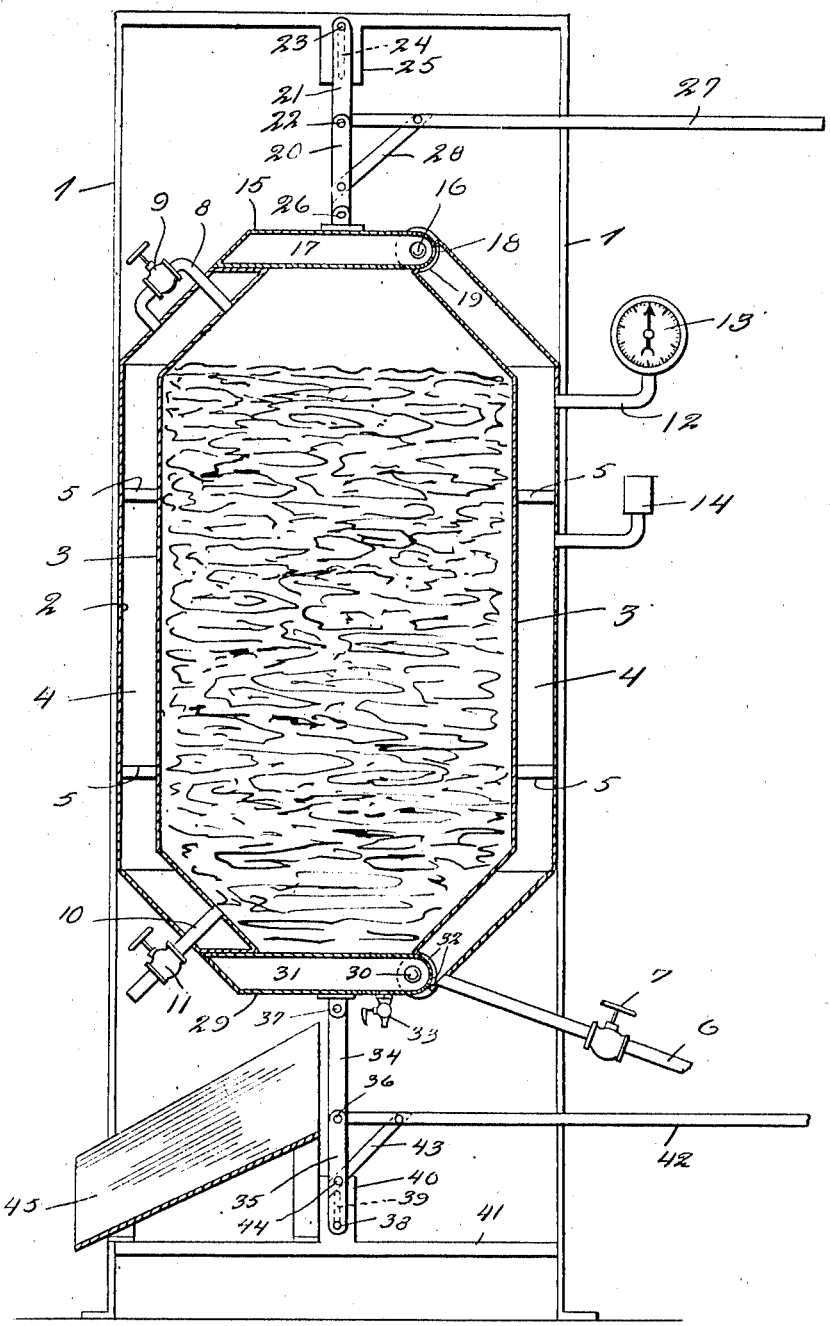

JOSEPH W. BLOSSER, OF ATLANTA, GEORGIA.

PROCESS OF DESTROYING INSECTS AND THEIR EGGS.

1,061,443. Specification of Letters Patent. Patented May 13, 1913.

Application filed July 8, 1912. Serial No. 708,327.

*To all whom it may concern:*

Be it known that I, JOSEPH W. BLOSSER, a citizen of the United States, residing at Atlanta, in the county of Fulton and State of Georgia, have invented certain new and useful Improvements in Processes of Destroying Insects and Their Eggs, of which the following is a specification.

This invention relates broadly to a process of and apparatus for treating vegetable matter, such as granular or fibrous foods, herbs and the like, to destroy insects and their eggs present therein.

It is a common practice to subject vegetable matter, such as granular or fibrous foods, herbs, and the like, to the action of steam, for the purpose of destroying insects and their eggs present therein. The great disadvantage heretofore encountered in the practice of this process is that the steam will dampen the material being treated, whereby such material has to be dried before it can be packed for shipment, to prevent the same from molding or decomposition. The drying of the material after being subjected to the action of steam is time consuming and adds materially to the expense of the process. Now I have discovered a method of treating vegetable matter, such as granular or fibrous foods, herbs or the like with steam to destroy the insects and their eggs present therein, without allowing the material to be left damp as a result of the treatment, whereby it is necessary to subject the same to a drying operation before packing the same for shipment.

In the practice of my process in its preferred form, the granular or fibrous foods, herbs, or the like are placed within a normally closed shell or casing, preferably surrounded by a steam jacket. Prior to this, however, steam under pressure exceeding atmospheric pressure, is introduced into the steam jacket and allowed to remain therein for a suitable length of time, so that the shell is warmed to approximately the temperature of the steam. This preliminary heating of the shell prevents the condensation of steam which is admitted into the shell. After introducing the material to be treated into the shell or casing and allowing it to remain therein until it is warmed to a moderate temperature, I introduce dry steam under pressure exceeding atmospheric pressure, preferably at a pressure of twenty pounds to the square inch or above, into the shell or casing and pass the same into the material therein for a suitable length of time to destroy the insects and their eggs present in such material. This treatment ordinarily requires from five to ten minutes. After the material has thus been treated with the dry steam, the pressure within the shell is suddenly released, whereby the material contained therein is explosively ejected therefrom, such explosive ejectment serving to release the steam contained in such material, without condensation therein or thereof to an appreciable extent. By this process the material is subjected to the action of dry steam to destroy the insects and their eggs present therein without leaving the material in a moist condition. After the material has been subjected to my process, it may be packed for shipment without being subjected to a drying operation and will not mold nor decompose from the presence of moisture therein.

While I have found it advantageous to subject most materials under treatment to a preliminary step of heating, I have found that it is not absolutely essential to do so in the case of some materials, but that such materials may be subjected directly to the action of the superheated steam without such preliminary treatment.

I have found that my process may be advantageously carried out in treating a large number of vegetable matters, such as tobacco, herbs, grain, cereals, and the like, wherein are present insects and their eggs, for the purpose of destroying such insects and their eggs.

An important object of this invention is to provide a simple and inexpensive process of treating granular or fibrous foods, herbs and the like for destroying the insects and their eggs present therein.

A further object of the invention is to provide a novel form of apparatus which is particularly well adapted for use in the practice of my process.

Other objects and advantages of the invention will be apparent during the course of the following description.

In the accompanying drawings forming a part of this specification, the figure is a central vertical sectional view through the apparatus.

In the drawings wherein is illustrated a preferred embodiment of my invention, the numeral 1 designates an upstanding supporting structure or frame within which is rigidly mounted a steam jacket 2, surrounding an inner shell or casing 3 for providing an annular steam space 4. The inner shell or casing 3 is retained in its concentric position with relation to the jacket 2 by spacing elements 5, as shown.

The numeral 6 designates a steam supply pipe, which leads from a source of steam under high pressure into the lower portion of the steam space 4, as shown. This steam supply pipe is provided with a cut-off valve 7. The steam supply pipe 6 also serves as a drain pipe for the lower end of the jacket 2. Connected with the upper end of the jacket 2 is an approximately U-shaped pipe 8, having one end thereof connected with the upper end of the inner shell 3, to discharge dry steam into the upper end of said shell 3. The pipe 8 is provided with a cut-off valve 9. A steam outlet pipe 10 is connected with the lower end of the shell 3 and passes through the lower end of the steam jacket 2. This steam outlet pipe is provided with a cut-off valve 11. Connected with the upper portion of the jacket 2 is a pipe 12, carrying a steam pressure gage 13. A safety valve 14 is also connected with the jacket 2, as shown.

The upper end of the inner shell or casing 3 is provided with an opening so that material may be fed into said shell or casing. This opening is normally closed by a hollow lid 15, forming a steam-tight joint with the shell. This lid is mounted to swing upon a transverse bolt 16. The hollow lid 15 has a steam space 17 in free communication with the steam space 4 through openings 18 and 19, as shown. The hollow lid 15 is normally retained in its seated position so that it cannot be opened by pressure within the shell 3 by means of a jointed link or toggle-joint connected at 22. The link 21 carries at its upper end a laterally extending pin 23, which is movably mounted within an elongated slot 24, formed in a depending extension 25 of the frame 1. The link 20 has its lower end pivotally connected with the lid 15, as shown at 26. The pin 22 which pivotally connects links 20 and 21 also passes through one end of a swinging lever 27, to which is connected a diagonal brace 28, having its opposite end connected with the link 20, as shown. It is thus seen that the lever 27 is rigidly connected with the link 20. When the lid 15 is in its closed position and the lever 27 is in its normal horizontal position, links 20 and 21 will occupy vertical positions and will be in alinement. It is obvious that pressure within the shell 3 cannot now open the lid 15. When the outer end of the lever 27 is depressed the pin or pivot point 22 is moved laterally to one side of pivot points 16 and 23, whereby the lid 15 may be opened. The lower end of the shell 3 is formed open and is normally closed by a hollow lid 29, pivoted as shown at 30. This hollow lid has a steam space 31 in free communication with the steam space 4, through openings 32. The lid 29 has a steam-tight connection with the shell 3 and is provided with a drain valve 33. This lid is normally held seated against movement by pressure within shell 3 by a link or toggle-joint structure, comprising links 34 and 35 pivotally connected by a pin 36. The link 34 is pivotally connected at its upper end with the lid 29, as shown at 37, while the link 35 carries at its lower end a laterally extending pin 38, which is movably mounted within the elongated slot 39, formed through a block 40. This block is carried by a horizontal beam 41, which is attached to the frame 1. The pin 36 also passes through an opening formed in the inner end of a swinging lever 42, connected with a diagonal brace 43, which is connected with the link 35, as shown at 44. It is thus seen that the lever 42 is disposed at right angles to the link 35 and is rigidly connected therewith. When the lid 29 is closed and the lever 42 is in its normal horizontal position, the links 34 and 35 will be in alinement or will form a straight angle, whereby pressure within the shell 3 cannot open the lid 29. When the free end of the lever 42 is moved downwardly slightly, pin 36 will be moved laterally to one side of the pivots 37 and 38, whereby the lid 29 may be quickly swung open by pressure within the shell 3. Disposed below and near the lid 29 is a chute or trough 45, to deflect material from the shell 3, when the same is explosively ejected therefrom upon the opening of the lid 29, as will be explained hereinafter.

In the practice of my process as carried out in the apparatus herein shown and described, the valve 7 is opened and steam is supplied to the steam jacket 4 for a suitable length of time to allow the walls of the chamber 3 to be raised to approximately the temperature of the steam. This ordinarily requires from three to five minutes. The material to be treated, such as tobacco, fibrous or granular foods and the like, is introduced into the chamber 3 through the upper opening thereof, it being understood that the lower door 29 is closed. Following the introduction of the material into the chamber 3, and the closing of the lid 15, a suitable length of time is allowed for the contained air and material under treatment to be subjected to a preliminary heating operation, the material being preferably heated to from approximately 150° F. to 212° F., depending upon the particular nature of the material under treatment. The valve 9 is now opened to admit dry steam, preferably under pressure of about twenty pounds to the square inch, into the upper end of the chamber 3, valve 11 having been opened simultaneously with the opening of valve 9. The steam passes through the material within the shell or chamber 3 and expels the air contained therein through the pipe 10. After the expulsion of the air from the shell or casing 3, the valve 11 is closed and the material under treatment is subjected to the action of the steam under pressure for approximately five minutes. The dry steam thus penetrates the material and destroys the insects and their eggs present therein. After the steam has acted upon the material within the shell 3 for the desired length of time, the outer end of the lever 42 is slightly depressed, whereby links 34 and 35 will be moved laterally slightly and pressure within the shell 3 will quickly swing the lid 29 to its open position. The steam pressure within the shell 3 also explosively ejects the material being treated from the lower end of the shell 3 into the trough 45 and the surrounding space, whereby the immediate escape of the steam from the material treated is accomplished and the condensation therein obviated. It will be found that the material subjected to the treatment described, will be sufficiently dry so that it may be packed for shipment without being subjected to a drying operation.

Having thus described my invention, I claim:—

1. The process of treating organic material to destroy animal life present therein, which consists in inclosing the material to be treated within a chamber, subjecting it to the action of steam under pressure in excess of atmospheric pressure, and suddenly releasing the pressure within the chamber.

2. The process of treating organic material to destroy animal life present therein, which consists in subjecting the material to be treated to the action of heat, then to the action of steam at a pressure exceeding atmospheric pressure, and suddenly releasing the pressure within the chamber to explosively eject the contents thereof.

3. The process of treating organic material to destroy animal life present therein, which consists in inclosing the material to be treated within a chamber, passing steam under pressure exceeding atmospheric pressure into said chamber, simultaneously permitting the escape of air from an outlet located at a point distant from the steam inlet, closing said outlet after the escape of the greater portion of the air within said chamber, subjecting the contents of the chamber to the action of steam under pressure exceeding atmospheric pressure, and suddenly releasing the pressure within the said chamber.

4. The process of treating organic material to destroy animal life present therein, which consists in inclosing the material to be treated within a chamber, passing steam under pressure exceeding atmospheric pressure into the upper portion of said chamber, simultaneously permitting the escape of air from the lower portion of such chamber, closing the air outlet after the escape of the greater portion of the air contained within said chamber, subjecting the contents of the chamber to the action of the steam until the said contents are of approximately the temperature of the steam, and suddenly releasing the pressure within the chamber to explosively eject the contents thereof.

5. The process of treating vegetable matter to destroy insects and their eggs present therein, which consists in heating the vegetable matter in a normally closed chamber, then injecting steam at a pressure exceeding atmospheric pressure into the closed chamber and suddenly forming a relatively large opening in the chamber, whereby the pressure is released and the vegetable matter is explosively ejected from said chamber.

6. The herein described process of treating material to destroy insects and their eggs present therein, which consists in subjecting the material to the action of steam under pressure with the exclusion of air, and suddenly releasing the steam pressure.

7. The herein described process of treating material to destroy insects and their eggs present therein, which consists in introducing such material into a normally closed shell, introducing steam under pressure into said shell, and explosively ejecting the material from said shell.

In testimony whereof I affix my signature in presence of two witnesses.

JOSEPH W. BLOSSER.

Witnesses:
C. L. PARKER,
ARTHUR L. BRYANT.